G. GARRETT.
Fender for Cultivator.
No. 78,799.
Patented June 9, 1868.
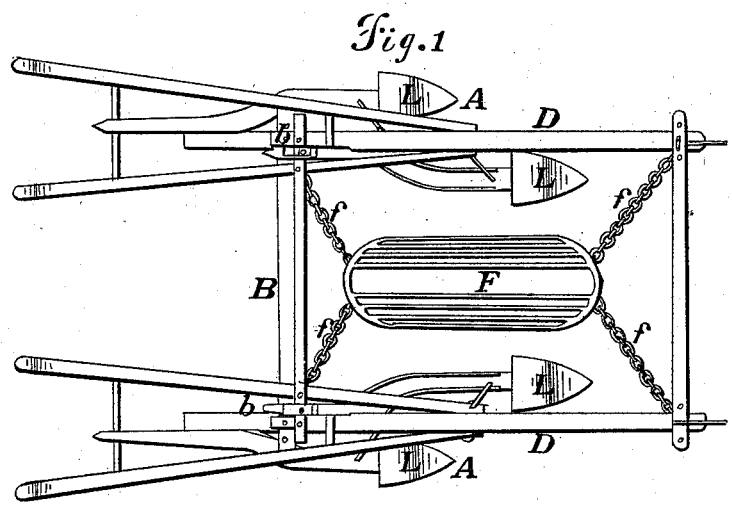
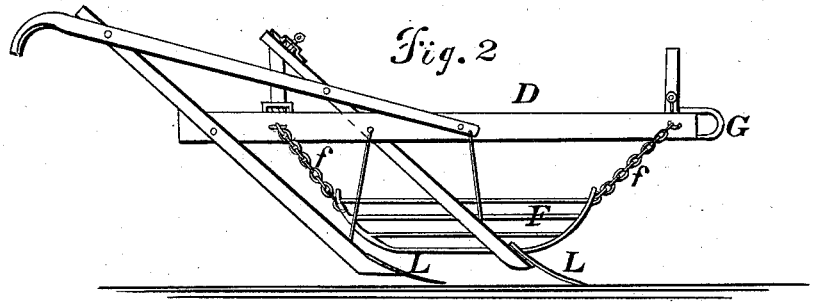
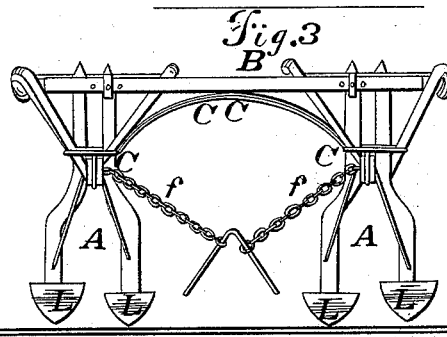

United States Patent Office.

GEORGE GARRETT, OF ELKHART CITY, ILLINOIS.

Letters Patent No. 78,799, dated June 9, 1868.

IMPROVEMENT IN CULTIVATORS.

*The Schedule referred to in these Letters Patent and making part of the same.*

TO ALL WHOM IT MAY CONCERN:

Be it known that I, GEORGE GARRETT, of Elkhart City, in the county of Logan, in the State of Illinois, have made certain new and useful Improvements in Cultivators; and do hereby declare that the following is a full, clear, and exact description of the same, reference being had to the accompanying drawings, and to the letters of reference marked thereon, and making part of this specification, in which—

Figure 1 is a plan view.
Figure 2 is a side view.
Figure 3 is an end view.

The nature of my invention consists in providing a double-shovel plow or cultivator with a semicircular or diagonal wire fender, so hinged and connected with suitable bearing-chains that the sod or clods of dirt thrown up by the shovel are cast to one side, thus guarding the centre of the same, and protecting the young corn or other grain from all injury and crushing effect, as is so common with double-shovel plows as now constructed.

To enable others skilled in the art to make and use my invention, I will now proceed to describe its construction and operation.

A A are two ordinary shovel-plows, constructed in the usual way. These are united together by means of an adjustable brace-beam, B, working in suitable metallic bearings, $b$, and the additional circular curved guide-beams C C, which also have suitable bearings at $c$ $c$.

D is the beam of the plows, L is the shovel, all constructed in any convenient manner.

F is the fender or screen. This fender or screen is attached to the double plow by means of suitable bearing-chains, $f f$.

The operation is as follows: In plowing, it is well known that in double-shovel plows, where the shovel works on each side of the furrow, very frequently, especially in dry seasons, heavy clods or "mats" are thrown up, which, in accordance with the ordinary construction of the shovel, of necessity are thrown upon the growing crop.

Practical experience has long since demonstrated how injurious in effect this method of cultivation was.

Now, according to my plan, the power being attached to the clevis-hook G, the two plows are drawn together in perfect parallel lines. Should an obstruction be met with by means of the adjustable brace-bearings B and C C, one plow can readily accommodate itself to the obstruction until the same is overcome, while at the same time the fender F, hanging, as it does, by means of the adjustable bearings $f f$, will always shield and protect the furrow, its centre opening, especially in the case of young grain, being sufficiently wide to pass over the young shoots or blades without in any manner interfering with the same or impeding its growth.

Having thus fully described my invention, and the operation of the same, what I claim as new therein, and desire to secure by Letters Patent of the United States, is—

Providing a double cultivator with a fender, F, having bearing-chains, $f f$, when the same are united and combined with the beams B and C C, and the whole is so constructed and arranged as to operate substantially as described and for the purpose specified.

In testimony whereof, I have signed my name to this specification in the presence of two subscribing witnesses.

GEORGE GARRETT.

Witnesses:
   WM. R. WARE,
   B. H. LAKE.